United States Patent
Zhao et al.

(10) Patent No.: US 12,401,885 B2
(45) Date of Patent: Aug. 26, 2025

(54) TARGET TRACKING METHOD AND SYSTEM OF SPIKING NEURAL NETWORK BASED ON EVENT CAMERA

(71) Applicants: ZHEJIANG LAB, Hangzhou (CN); ZHEJIANG UNIVERSITY, Hangzhou (CN)

(72) Inventors: Wenyi Zhao, Hangzhou (CN); Huajin Tang, Hangzhou (CN); Chaofei Hong, Hangzhou (CN); Xiao Wang, Hangzhou (CN); Mengwen Yuan, Hangzhou (CN); Yujing Lu, Hangzhou (CN); Mengxiao Zhang, Hangzhou (CN); Gang Pan, Hangzhou (CN)

(73) Assignees: ZHEJIANG LAB, Hangzhou (CN); ZHEJIANG UNIVERSITY, Hangzhou (CN)

( * ) Notice: Subject to any disclaimer, the term of this patent is extended or adjusted under 35 U.S.C. 154(b) by 148 days.

(21) Appl. No.: 18/240,526

(22) Filed: Aug. 31, 2023

(65) Prior Publication Data

US 2023/0410328 A1    Dec. 21, 2023

Related U.S. Application Data

(63) Continuation of application No. PCT/CN2023/085815, filed on Apr. 1, 2023.

(30) Foreign Application Priority Data

Apr. 7, 2022    (CN) ......................... 202210357273.6

(51) Int. Cl.
*H04N 23/617* (2023.01)
*G06F 18/213* (2023.01)
(Continued)

(52) U.S. Cl.
CPC ......... *H04N 23/617* (2023.01); *G06F 18/213* (2023.01); *G06N 3/045* (2023.01);
(Continued)

(58) Field of Classification Search
CPC ...... H04N 23/617; H04N 23/60; H04N 23/61; H04N 23/611; H04N 23/667;
(Continued)

(56) References Cited

U.S. PATENT DOCUMENTS

| 10,535,146 | B1 * | 1/2020 | Buibas | ................. G06T 17/00 |
| 2020/0019921 | A1 * | 1/2020 | Buibas | ................. G06T 19/003 |
| 2021/0105421 | A1 * | 4/2021 | Kukreja | ................. H04N 25/42 |

FOREIGN PATENT DOCUMENTS

| CN | 110148159 A | 8/2019 |
| CN | 111709967 A | 9/2020 |

(Continued)

OTHER PUBLICATIONS

International Search Report of PCT/CN2023/085815.

*Primary Examiner* — Twyler L Haskins
*Assistant Examiner* — Akshay Trehan

(57) ABSTRACT

A target tracking method and a target tracking system of a spiking neural network based on an event camera are provided. The method includes: acquiring a data stream of asynchronous events in a high dynamic scene of a target by an event camera as input data; dividing the data stream of the asynchronous events into synchronous event frames with millisecond time resolution; training a twin network based on a spiking neural network by a gradient substitution algorithm with a target image as a template image and a complete image as a searched image; and tracking the target by a trained twin network with interpolating a result of feature mapping to up-sample and obtaining the position of (Continued)

the target in an original image. The twin network includes a feature extractor and a cross-correlation calculator.

19 Claims, 4 Drawing Sheets

(51) Int. Cl.
| | |
|---|---|
| *G06N 3/045* | (2023.01) |
| *G06N 3/049* | (2023.01) |
| *G06N 3/08* | (2023.01) |
| *G06T 3/4007* | (2024.01) |
| *G06T 3/4046* | (2024.01) |
| *G06T 7/246* | (2017.01) |
| *G06T 7/73* | (2017.01) |
| *G06V 10/74* | (2022.01) |
| *G06V 10/77* | (2022.01) |
| *G06V 10/774* | (2022.01) |
| *G06V 10/82* | (2022.01) |
| *G06V 20/52* | (2022.01) |
| *H04N 23/741* | (2023.01) |
| *H04N 25/47* | (2023.01) |
| *H04N 25/707* | (2023.01) |

(52) U.S. Cl.
CPC .............. *G06N 3/049* (2013.01); *G06N 3/08* (2013.01); *G06T 3/4007* (2013.01); *G06T 3/4046* (2013.01); *G06T 7/248* (2017.01); *G06T 7/74* (2017.01); *G06V 10/761* (2022.01); *G06V 10/77* (2022.01); *G06V 10/7715* (2022.01); *G06V 10/774* (2022.01); *G06V 10/82* (2022.01); *G06V 20/52* (2022.01); *H04N 23/741* (2023.01); *H04N 25/47* (2023.01); *H04N 25/707* (2023.01); *G06T 7/246* (2017.01); *G06T 2207/10016* (2013.01); *G06T 2207/20081* (2013.01); *G06T 2207/20084* (2013.01); *G06V 2201/07* (2022.01)

(58) Field of Classification Search
CPC ...... H04N 23/815; H04N 25/42; H04N 25/46; H04N 23/69; H04N 23/695; H04N 23/741; H04N 25/40; H04N 25/47; H04N 25/707; G06T 3/4007; G06T 3/4046; G06T 7/248; G06T 7/74; G06T 7/246; G06T 2207/10016; G06T 2207/20081; G06T 2207/20084; G06V 10/761; G06V 10/77; G06V 10/7715; G06V 10/774; G06V 10/82; G06V 20/52; G06V 2201/07; G06N 3/045; G06N 3/049; G06N 3/08; G06F 18/213
See application file for complete search history.

(56) References Cited

FOREIGN PATENT DOCUMENTS

| | | | | |
|---|---|---|---|---|
| CN | 112837344 | A * | 5/2021 | ............. G06N 3/045 |
| CN | 114202564 | A * | 3/2022 | ............. G06N 3/045 |
| CN | 114429491 | A | 5/2022 | |

* cited by examiner

TARGET TRACKING METHOD AND SYSTEM OF SPIKING NEURAL NETWORK BASED ON EVENT CAMERA

CROSS-REFERENCE TO RELATED APPLICATIONS

This application is a continuation of international patent application No. PCT/CN2023/085815, filed on Apr. 1, 2023, which itself claims priority to Chinese patent application No. 202210357273.6, filed on Apr. 7, 2022, titled "TARGET TRACKING METHOD AND SYSTEM OF SPIKING NEURAL NETWORK BASED ON EVENT CAMERA". The contents of the above applications are hereby incorporated by reference.

TECHNICAL FIELD

The present disclosure generally relates to a field of target tracking, and in particular, to a target tracking method and a target tracking system of a spiking neural network based on an event camera.

BACKGROUND

Recognition and tracking of a moving target are a hotspot problem in a field of computer vision, and widely applied in a human-computer interaction field, a video tracking field, a visual navigation field, a robotic field and a military guidance field. At present, a target tracking method based on correlation filtering and a target tracking method based on deep learning are two mainstream technical routes of target tracking.

The target tracking method based on correlation filtering has a fast tracking speed, but a feature extraction ability of the method is limited. Moreover, a tracking effect of the method is poor when problems of scale transformation of a target and target loss occur. The target tracking method based on deep learning has a good feature expression ability and higher tracking accuracy. However, it is accompanied by an increase in an amount of calculation, which is limited in real-time performance of target tracking. In addition, the method is greatly affected by lighting, and is not suitable in a high dynamic scene.

Compared with a conventional frame-rate camera, Event-based camera (EB) and Dynamic vision sensor (DVS) have different operation modes. Output of the EB or the DVS is not an intensity image, but asynchronous event streams with microsecond time resolution, and each pixel is generated independently. Compared with the frame-rate camera, the Event-based camera has advantages of low latency, low power consumption, and high dynamic range and the like, and is more suitable for rapid target tracking in a scene with a severe lighting condition such as a too bright condition, a too dark condition, or a condition of strong contrast between light and dark.

In addition, compared with an artificial neural network, space-time information can be fused by a spiking neural network due to a spiking emitting mechanism. A way of simulating a biological membrane potential in the spiking neural network has higher biological authenticity.

SUMMARY

According to various embodiments of the present embodiments, a target tracking method and a target tracking system of a spiking neural network based on an event camera are provided.

In a first aspect of the present disclosure, the target tracking method of the spiking neural network based on the event camera is provided, which including:

acquiring a data stream of asynchronous events in a high dynamic scene of a target by an event camera as input data;

dividing the data stream of the asynchronous events into synchronous event frames with millisecond time resolution by asynchronous event accumulation, the synchronous event frames are binary images similar to a spiking;

training a twin network based on a spiking neural network by a gradient substitution algorithm with a target image as a template image denoted as z and a complete image as a searched image denoted as x, the twin network includes a feature extractor with weight sharing and a cross-correlation calculator for calculating a position of the target; and tracking the target by a trained twin network with interpolating a result of feature mapping to up-sample and obtaining the position of the target in an original image.

In some embodiments, the synchronous event frames are generated by dividing the asynchronous events according to a set size and number of time steps, accumulating the data stream of the asynchronous events within each time step, setting a pixel of a coordinate to 1 as long as the number of the asynchronous events generated at the coordinate within the same time step is greater than 0, otherwise setting the pixel of the coordinate to 0, and ultimately generating event frame images divided by the time steps.

In some embodiments, the feature extractor is generated by adopting a spiking convolutional neural network as the feature extractor. A network structure of the spiking convolutional neural network is 96C5-2S-256C3-2S-384C3-384C3-256C3, 96C5 represents a spiking convolutional layer with a convolutional kernel size of 5 and an output channel of 96, 2S represents a pooling layer with a down-sampling of 2 times, and the rest network structure is in a similar manner. A convolutional step of a first convolutional layer is 2, convolutional steps of the rest convolutional layers are 1, and all of convolutional layers of the feature extractor are followed by a spiking neuron.

In some embodiments, the spiking neuron is a Leaky integrate and fire (LIF) neuron model, i.e., $$\tau_m \frac{dV}{dt} = V_{rest} - V + R_m I$$

$\tau_m$ represents a membrane time constant, V represents a membrane potential, t represents a spiking time, $V_{rest}$ represents a resting potential, and $R_m$ and I represent impedance and input current of a cell membrane, respectively.

The feature extractor is denoted as φ, a size of the template image z is 255*255*3, a size of the searched image x is 127*127*3, an output after an operation of the feature extractor is φ(z) with a size of 6*6*256 and φ(x) with a size of 22*22*256.

In some embodiments, an operation of the cross-correlation calculator includes: configuring a feature mapping denoted as φ(z) after extracting features from the template image z to be a convolutional kernel, configuring a feature mapping φ(x) after extracting features from the searched image x to be a feature map to be convolved, and performing a convolution operation on the convolutional kernel and the feature map to be convolved. A result produced after the convolution operation of the current convolutional layer is a similarity heatmap that represents a prediction probability of a predicted center position of the target, and a position of a maximum spiking issuance rate is the predicted center position of the target.

In some embodiments, the twin network is generated by:
adopting a brain-inspired computing development framework, and putting a padded template image and the searched image into the same batch sequentially based on batch training, so that the number of neurons in an input layer for the padded template image is the same as that for the searched image, and the padded template image and the searched image share the same network connection;
after operation of the feature extractor denoted as p, cropping an output of an odd-numbered sample that is an output of a z-branch denoted as φ(z) to delete edge-padding of φ(z), and obtaining the feature mapping with a due size of 6*6*256.

In some embodiments, the target tracking method of the spiking neural network based on the event camera further including:
performing no update on the target image that is the template image, performing an operation φ(z) of the feature extractor for an initial target once, configuring the searched image to be an image equivalent to 4 times a size of the template image, the searched image is centered on the position of the target and cropped from a previous synchronous event frame, and a search area is narrowed to improve real-time performance;
adopting bicubic interpolation to up-sample and revert a size of the similarity heatmap, determining a predicted position of the target, adopting three scales to search, that is, scaling the similarity heatmap to $1.03^{\{-1,0,1\}}$ respectively, and selecting a position of a maximum spiking issuance rate from a scaling output as a final result, the maximum spiking issuance rate is a maximum similarity.

In a second aspect of the present disclosure, a target tracking system of a spiking neural network based on an event camera is provided, including a data stream acquiring module, a high time resolution event frame generating module, a network training module, and a network output module.

The data stream acquiring module is configured for acquiring a data stream of asynchronous events in a high dynamic scene of a target by an event camera as input data. The high time resolution event frame generating module is configured for dividing the data stream of the asynchronous events into synchronous event frames with millisecond time resolution by asynchronous event accumulation. The synchronous event frames are binary images similar to a spiking. The network training module is configured for training a twin network based on a spiking neural network by a gradient substitution algorithm with a target image as a template image denoted as z and a complete image as a searched image denoted as x. The twin network includes a feature extractor with weight sharing and a cross-correlation calculator for calculating a position of the target. The network output module is configured for tracking the target by a trained twin network with interpolating a result of feature mapping to up-sample and obtaining the position of the target in an original image.

In a third aspect of the present disclosure, an electronic device is provided, including a processor and a memory. The memory stores a computer program executable by the processor to implement the steps of the target tracking method of the spiking neural network based on the event camera of any embodiment of the first aspect.

In a fourth aspect of the present disclosure, a computer-readable storage medium is provided. The computer-readable storage medium has stored a computer program, the computer program is executed by a processor to implement the steps of the target tracking method of the spiking neural network based on the event camera of any embodiment of the first aspect.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

To describe and illustrate embodiments and/or examples of the present disclosure made public here better, reference may be made to one or more of the figures. The additional details or embodiments used to describe the figures should not be construed as limiting the scope of any of the present disclosure, the embodiments and/or examples currently described, and the best model of the present disclosure as currently understood.

DETAILED DESCRIPTION OF THE EMBODIMENT

Figure 1:
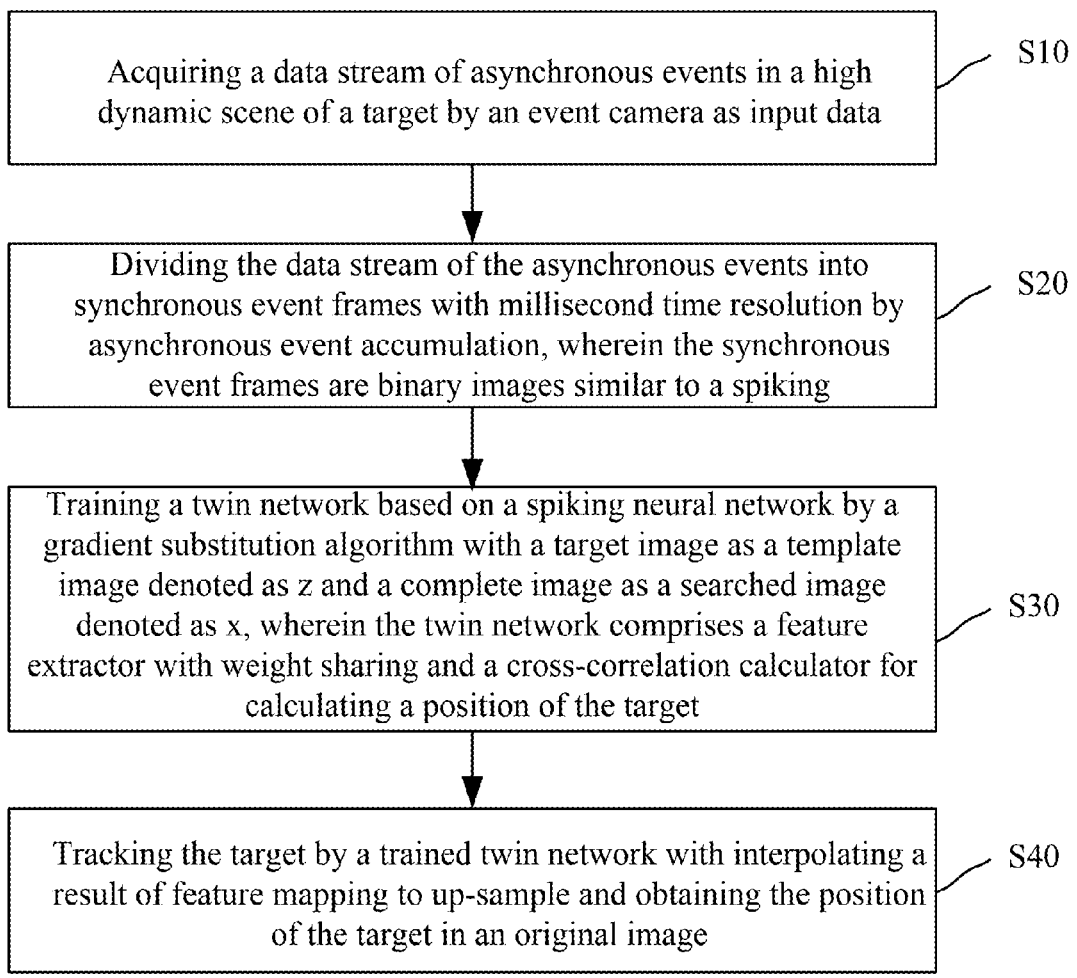
FIG. 1 is a flowchart diagram of a target tracking method of a spiking neural network based on an event camera in one or more embodiments of the present disclosure.

In order to make objects, technical solutions and advantages of the present disclosure more clearly understood, the technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without creative work are the scope of the present disclosure.

The present disclosure is further described in detail below with reference to the accompanying drawings and embodiments. It is understood that the specific embodiments described herein are only used to explain the related disclosure, not to qualify the disclosure. It should also be noted that, for the sake of description, only the parts relevant to the disclosure in question are shown in the drawings.

It should be noted that, the embodiments and the features in the embodiments in the present may be combined in the absence of conflict A target tracking method of a spiking neural network based on an event camera is provided. Referring to FIG. 1, the method includes the following step 10 to step 40:

at step 10, acquiring a data stream of asynchronous events in a high dynamic scene of a target by an event camera as input data;

at step 20, dividing the data stream of the asynchronous events into synchronous event frames with millisecond time resolution by asynchronous event accumulation, the synchronous event frames are binary images similar to a spiking;

at step 30, training a twin network based on a spiking neural network by a gradient substitution algorithm with a target image as a template image denoted as z and a complete image as a searched image denoted as x, the twin network including a feature extractor with weight sharing and a cross-correlation calculator for calculating a position of the target; and at step 40, tracking the target by a trained twin network at the step 30 with interpolating a result of feature mapping to up-sample and obtaining the position of the target in an original image.

In order to more clearly illustrate the target tracking method of the spiking neural network based on the event camera, the steps in some embodiments of the present disclosure are described in detail with reference to the accompanying drawings.

Step 10 includes acquiring the data stream of asynchronous events in the high dynamic scene of the target by the event camera as input data.

In the present embodiment, the data stream of asynchronous events in the high dynamic scene of the target can be acquired by the event camera. Specifically, the data stream can be in a format of [t, p, x, y], where t represents a timestamp, p represents polarity of the asynchronous events, and x and y represent a coordinate of the asynchronous events in a pixel coordinate system.

Step 20 includes dividing the data stream of the asynchronous events into synchronous event frames with millisecond time resolution by asynchronous event accumulation, and the synchronous event frames are binary images similar to the spiking.

Figure 3:
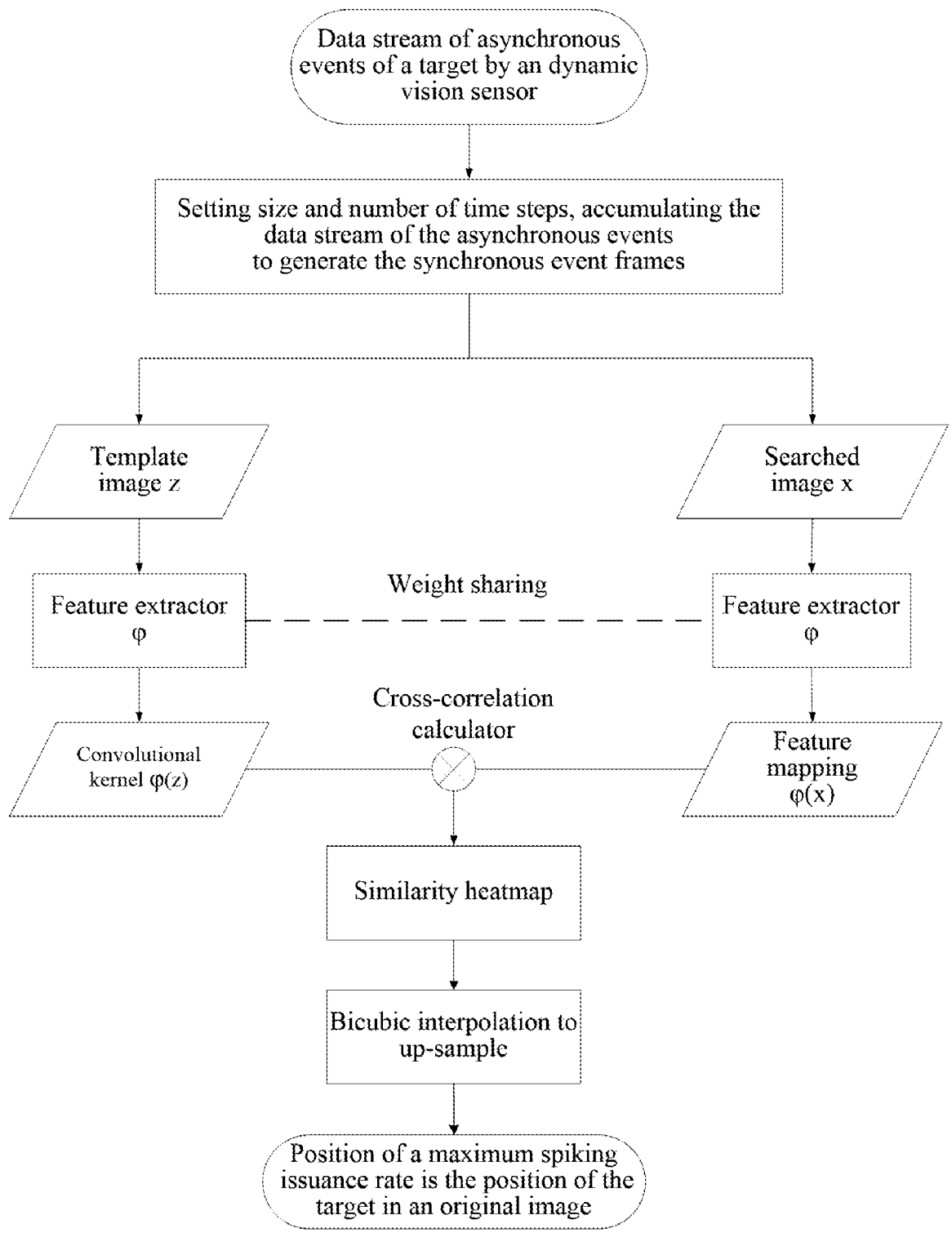
FIG. 3 is a schematic flowchart diagram of a target tracking method of a spiking neural network based on an event camera in one or more embodiments of the present disclosure.

In the present embodiment, the asynchronous events can be divided according to a set size and number of time steps. Alternatively, the size of a time step can be 0.1 millisecond. Taking 50 time steps as an example, the event camera can achieve a shooting rate equivalent to that of 200 FPS (Frames Per Second) in a conventional frame-rate camera, which greatly improves real-time performance of the data stream. The data stream of the asynchronous events within each time step can be accumulated, a pixel of a coordinate can be set to 1 as long as the number of the asynchronous events generated at the coordinate within the same time step is greater than 0, otherwise the pixel of the coordinate can be set to 0, and ultimately event frame images divided by the time steps can be generated. In the present embodiment, asynchronous events with positive polarity can be processed, and the asynchronous events with positive polarity refers to p=1. Referring to FIG. 3, contents not referred above is described below.

Step 30 includes training the twin network based on the spiking neural network by the gradient substitution algorithm with the target image as the template image denoted as z and the complete image as the searched image denoted as x. The twin network includes the feature extractor with weight sharing and the cross-correlation calculator for calculating the position of the target.

Step 30 can include step 301 to step 305.

Step 301 can include configuring a structure of the feature extractor. In the present embodiment, the feature extractor can be a spiking convolutional neural network. A network structure of the spiking convolutional neural network can be 96C5-2S-256C3-2S-384C3-384C3-256C3, 96C5 represents a spiking convolutional layer with a convolutional kernel size of 5 and an output channel of 96, 2S represents a pooling layer with a down-sampling of 2 times, and the rest network structure is in a similar manner; a convolutional step of a first convolutional layer is 2, convolutional steps of the rest convolutional layers are 1, and all of convolutional layers of the feature extractor are followed by a spiking neuron.

Alternatively, the spiking neuron can be a Leaky integrate and fire (LIF) neuron model, i.e., $$\tau_m \frac{dV}{dt} = V_{rest} - V + R_m I$$

$\tau_m$ represents a membrane time constant, V represents a membrane potential, t represents a spiking time, $V_{rest}$ represents a resting potential, and $R_m$ and I represent impedance and input current of a cell membrane, respectively.

The feature extractor can be denoted as φ, a size of the template image z can be 255*255*3, a size of the searched image x can be 127*127*3, an output after an operation of the feature extractor can be φ(z) with a size of 6*6*256 and φ(x) with a size of 22*22*256.

Step 302 can include configuring a structure of the cross-correlation calculator. In the present embodiment, the cross-correlation calculator can be a convolutional layer. In the convolutional layer, a feature mapping denoted as φ(z) after extracting features from the template image z can be configured to be a convolutional kernel, and a feature mapping φ(x) after extracting features from the searched image x can be configured to be a feature map to be convolved. The cross-correlation calculator can satisfy the following formula: f(z, x)=φ(z)*φ(x)+b, b represents a bias term. A result produced after the convolution operation of the current convolutional layer can be a similarity heatmap with a size of 17*17*1, the similarity heatmap represents a prediction probability of a predicted center position of the target, and a position of a maximum spiking issuance rate can be the predicted center position of the target.

Step 303 can include configuring forward propagation of the spiking convolutional neural network. In the present embodiment, a structure of the twin network can include two code implementations, according to different development frameworks. In a first code implementation, deep learning development frameworks such as Pytorch and Tensorflow can be applied to achieve a weight sharing concept of the twin network directly, and different outputs can be generated by the same network according to different inputs. That is, the feature mapping denoted as φ(z) can be calculated once by a twin network denoted as φ and the feature mapping φ(x) can be calculated again by the twin network φ. In a second code implementation, a brain-inspired computing development framework developed specifically for the spiking neural network can be provided. A design concept of the brain-inspired computing development framework is to simulate a neural structure of a biological organism. The number of spiking neurons in each convolutional layer need to be clearly indicated in the network connections defined by the brain-inspired computing development framework. In the present embodiment, a size of the template image z input into one branch of the twin network is different from that of the searched image x input into another branch of the twin network. The number of spiking neurons in the input layer can be different in correspondingly network connections. Therefore, when a conventional code implementation is adopted, the two branches of the twin network will generate two different networks and cannot share a weight.

In the present embodiment, in order to solve the above problems in the brain-inspired computing development framework, a solution based on batch training is proposed. Edge-padding of 0 can be performed on the template image z and the number of edge-padding pixels can be denoted as p, so that the size of the template image z can be equal to that of the searched image x. A padded template image z and the searched image x can be put into the same batch sequentially, so that a batch size of a new batch can become twice the original batch. In the new batch, odd samples can be z, and even samples can be x, so that the number of the spiking neurons in the input layer can be the same and share the same network connection. After operation of the feature extractor denoted as φ, an output of an odd-numbered sample that is an output of a z-branch denoted as φ(z) can be cropped to delete edge-padding of φ(z), and the feature mapping with a due size of 6*6*256 can be obtained. In this way, each consecutive two samples in the same batch can be a group, a feature mapping φ(z) of the odd samples can be configured to be the convolutional kernel, and a feature mapping φ(x) of the even samples can be configured to be the feature map to be convolved. Cross-correlation calculation can be performed, which can achieve the same effect as the deep learning development framework.

Step 304 can include designing a loss function. In the present embodiment, the loss function of each pixel can be configured as l(y, v)=log (1+exp (−yv)), where y represents a real label, that is, a position of the target in an original image is 1, a position without the target in the original image is −1, v is the similarity heatmap output by the cross-correlation calculator, and a value of v is a real value. When the similarity heatmap is denoted as D, the overall loss function can be $$L(y, v) = \frac{1}{|D|}\sum_{D} l(y, v),$$

that is, an average of loss functions of all pixels on the similarity heatmap D.

Step 305 can include selecting a learning algorithm. In the present embodiment, the twin network based on the spiking neural network can be trained by the gradient substitution algorithm. Alternatively, STBP (Spatio-Temporal Backpropagation), STCA (Spatio-Temporal Credit Assignment) or other algorithms can be applied to replace the non-derivable spiking output with an approximate continuous derivable function. Gradient descent methods such as SGD (Stochastic Gradient Descent) or Adam (Adaptive Moment Estimation) can be applied to optimize parameters of the twin network.

Step 40 can include tracking the target by a trained twin network at step 30 with interpolating a result of feature mapping to up-sample and obtaining the position of the target in an original image.

In the present embodiment, no update can be performed on the target image that is the template image, an operation of the feature extractor φ(z) can be performed for an initial target once.

Due to a low latency characteristic of the event camera, in the present embodiment, the searched image can be an image equivalent to 4 times the size of the template image. The searched image can be centered on the position of the target and cropped from a previous synchronous event frame, and a search area can be narrowed to improve real-time performance Bicubic interpolation can be adopted to up-sample and revert a size of the similarity heatmap from 17*17 to 272*272, so that a predicted position of the target can be determined.

In the present embodiment, three scales can be adopted to search, which is scaling the similarity heatmap to $1.03^{\{-1, 0, 1\}}$ respectively. A position of a maximum spiking issuance rate can be selected from a scaling output as a final result, and the maximum spiking issuance rate can be a maximum similarity.

The beneficial effect of the present disclosure is as follows, the method in the present disclosure can reduce a transmission delay of image data and a calculation delay of the target tracking method, and improve accuracy for target tracking in the high dynamic scene.

(1) In the present embodiment, the data stream of asynchronous events of the target can be acquired by the event camera, which can reduce the amount of data transmission and reduce a communication delay.

(2) In the present embodiment, the synchronous event frames can be obtained by dividing the data stream of the asynchronous events according to time steps and input into the spiking neural network in real time, thus eliminating a requirement of spiking coding when a conventional image frame is input into the spiking neural network.

(3) Compared with a deep neural network, spiking computing is adopted in the spiking neural network described in the present disclosure, thus reducing calculation amount and a calculation delay of the method.

(4) In the present disclosure, the spiking convolutional neural network can be adopted to extract features from the data stream by the event camera, which can improve tracking accuracy of the method in the high dynamic scene.

Figure 2:
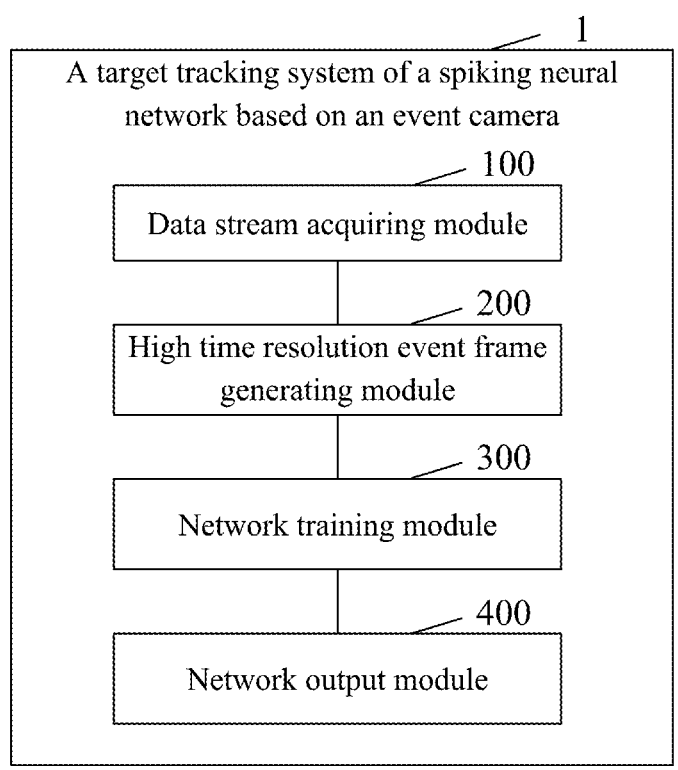
FIG. 2 is a block diagram of a target tracking system of a spiking neural network based on an event camera in one or more embodiments of the present disclosure.

The present disclosure provides a target tracking system 1 of the spiking neural network based on the event camera. Referring to FIG. 2, the target tracking system 1 of the spiking neural network based on the event camera includes a data stream acquiring module 100, a high time resolution event frame generating module 200, a network training module 300, and a network output module 400.

The data stream acquiring module 100 is configured for acquiring a data stream of asynchronous events in a high dynamic scene of a target by an event camera as input data.

The high time resolution event frame generating module 200 is configured for dividing the data stream of the asynchronous events into synchronous event frames with millisecond time resolution by asynchronous event accumulation. The synchronous event frames are binary images similar to a spiking.

The network training module 300 is configured for training a twin network based on a spiking neural network by a gradient substitution algorithm with a target image as a template image denoted as z and a complete image as a searched image denoted as x. The twin network includes a feature extractor with weight sharing and a cross-correlation calculator for calculating a position of the target.

The network output module 400 is configured for tracking the target by a trained twin network in the network training module 300 with interpolating a result of feature mapping to up-sample and obtaining the position of the target in an original image.

A person skilled in the art may clearly understand that, for convenience and conciseness of the description, a specific operation process of the system described above and related descriptions may refer to a corresponding process in the embodiment of the foregoing method, which will not be repeated herein.

It should be noted that, the target tracking system of the spiking neural network based on the event camera provided in the above embodiment is illustrated by the division of the above functional modules. In practical applications, the foregoing function may be allocated to different functional modules to complete according to needs, that is, the modules or steps in the embodiments of the present embodiment may be re-decomposed or combined. For example, the modules of the above embodiments may be combined into one module, or may be further split into a plurality of sub-modules to complete all or some of the functions described above. The names of the modules and steps involved in the embodiments of the present embodiment are merely for distinguishing various modules or steps, and are not considered as improper limitations to the present disclosure.

It should be noted that the various modules mentioned above may be function modules or program modules, and may be implemented either by software or hardware. For modules implemented by hardware, the modules mentioned above may be located in the same processor; or the modules mentioned above may be separately located in different processors in any combination form.

Figure 4:
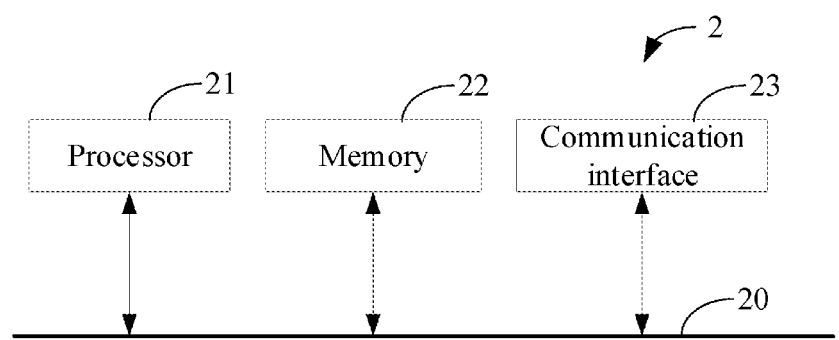
FIG. 4 is a schematic diagram of an electronic device in one or more embodiments of the present disclosure.

In addition, the target tracking method of the spiking neural network based on the event camera of embodiments of the present disclosure described in conjunction with FIG. 1 to FIG. 3 may be implemented by an electronic device 2. FIG. 4 is a schematic diagram of the electronic device 2 in the present embodiment.

The electronic device 2 may include a processor 21 and a memory 22 that stores computer program instructions.

Specifically, the processor 21 described above may include a Central Processing Unit (CPU), or an Application Specific Integrated Circuit (ASIC), or may be configured to implement one or more integrated circuits of embodiments of the present disclosure.

The memory 22 may include mass storage for data or instructions. By way of example and not limitation, the memory 22 may include a Hard Disk Drive (HDD), a floppy disk drive, a Solid State Drive (SSD), a flash memory, an optical disk, a magnetic disk, a magnetic tape, or a Universal Serial Bus (USB) drive or a combination of two or more of the above. Where appropriate, the memory 22 may include removable or non-removable (or fixed) media. Where appropriate, memory 22 may be internal or external to the data processing device. In particular embodiments, memory 22 is Non-Volatile memory. In particular embodiments, the memory 22 includes Read-Only Memory (ROM) and Random Access Memory (RAM). Where appropriate, the ROM may be a mask-programmable ROM, a Programmable Read-Only Memory (PROM), an Erasable Programmable Read-Only Memory (EPROM), an Electrically Erasable PROM (Electrically Erasable Programmable Read-Only Memory), an Electrically Alterable Read-Only Memory (EAROM), or a Flash Memory, or a combination of two or more of the above. Where appropriate, the RAM may be a Static Random-Access Memory (SRAM) or a Dynamic Random Access Memory (DRAM).

The memory 22 may be configured to store or cache various data files to be processed and/or communicated, and processor 21 may execute computer program instructions.

The processor 21 is configured for achieving any of the above embodiments of the target tracking method of the spiking neural network based on the event camera by reading and executing the computer program instructions stored in the memory 22.

In some embodiments, the electronic device 2 may also include a communication interface 23 and a bus 70. Referring to FIG. 4, the processor 21, the memory 22, the communication interface 23 can be connected and communicated with each other via the bus 20.

The communication interface 23 is configured to implement communication between modules, apparatus, units and/or devices in embodiments of the present disclosure. The communication interface 23 may also realize data communication with other components such as: external devices, image/data acquisition devices, databases, external storage, and image/data processing workstations.

The bus 20 includes hardware, software or both, the components of the electronic device 2 are coupled with each other. The bus 20 includes, but is not limited to, at least one of the following: Data Bus, Address Bus, Control Bus, Expansion Bus, Local Bus. By way of example and not limitation, the bus 20 may include Accelerated Graphics Port (AGP) or other graphics buses, Extended Industry Standard Architecture (EISA) buses, Front Side Bus (FSB), Hyper Transport (HT) interconnect, Industry Standard Architecture (ISA) bus, InfiniBand interconnect, Low Pin Count (LPC) bus, memory bus, Micro Channel Architecture (MCA) bus, Peripheral Component Interconnect (PCI) bus, PCI-Express (PCI-X) bus, Serial Advanced Technology Attachment (SATA) bus, Video Electronics Standards Association Local Bus (VLB) bus or other suitable bus or a combination of two or more of the above. Where appropriate, the bus 20 may include one or more buses. Although embodiments of the present disclosure describe and illustrate a particular bus, any suitable bus or interconnection can be considered in the present disclosure.

Furthermore, in conjunction with the target tracking method of the spiking neural network based on the event camera in the above embodiment, an embodiment of the present disclosure may provide a computer-readable storage medium to achieve. The computer-readable storage medium stores computer program instructions, and the computer program is executed by a processor to implement any of the target tracking methods of the spiking neural network based on the event camera in the above embodiments.

Specific examples are used to describe the principles and embodiments of the present disclosure, and the description of the above embodiments is merely used to help understand the method of the present disclosure and the core idea thereof. Meanwhile, for a person skilled in the art, according to the idea of the present disclosure, there are changes in specific embodiments and the scope of the disclosure. In summary, the content of the present specification should not be construed as limiting the present disclosure.

What is claimed is:

1. A target tracking method of a spiking neural network based on an event camera, the method comprising:
  acquiring a data stream of asynchronous events in a high dynamic scene of a target by an event camera as input data;
  dividing the data stream of the asynchronous events into synchronous event frames with millisecond time resolution by asynchronous event accumulation, wherein the synchronous event frames are binary images similar to a spiking;

training a twin network based on a spiking neural network by a gradient substitution algorithm with a target image as a template image denoted as z and a complete image as a searched image denoted as x, wherein the twin network comprises a feature extractor with weight sharing and a cross-correlation calculator for calculating a position of the target, the target image is an image of the target in the synchronous event frames, and the complete image comprises any one of all the synchronous event frames; and tracking the target by a trained twin network with interpolating a result of feature mapping to up-sample and obtaining the position of the target in an original image.

2. The target tracking method of the spiking neural network based on the event camera of claim 1, wherein the synchronous event frames are generated by dividing the asynchronous events according to a set size and number of time steps, accumulating the data stream of the asynchronous events within each time step, setting a pixel of a coordinate to 1 as long as the number of the asynchronous events generated at the coordinate within the same time step is greater than 0, otherwise setting the pixel of the coordinate to 0, and ultimately generating event frame images divided by the time steps.

3. The target tracking method of the spiking neural network based on the event camera of claim 1, wherein the feature extractor is generated by adopting a spiking convolutional neural network as the feature extractor, wherein a network structure of the spiking convolutional neural network is 96C5-2S-256C3-2S-384C3-384C3-256C3, wherein 96C5 represents a spiking convolutional layer with a convolutional kernel size of 5 and an output channel of 96, 2S represents a pooling layer with a down-sampling of 2 times, and the rest network structure is in a similar manner; a convolutional step of a first convolutional layer is 2, convolutional steps of the rest convolutional layers are 1, and all of convolutional layers of the feature extractor are followed by a spiking neuron.

4. The target tracking method of the spiking neural network based on the event camera of claim 3, wherein the spiking neuron is a Leaky integrate and fire neuron model, i.e., $$\tau_m \frac{dV}{dt} = V_{rest} - V + R_m I,$$

wherein $\tau_m$ represents a membrane time constant, V represents a membrane potential, t represents a spiking time, $V_{rest}$ represents a resting potential, and $R_m$ and I represent impedance and input current of a cell membrane, respectively;

the feature extractor is denoted as $\varphi$, a size of the template image z is 255*255*3, a size of the searched image x is 127*127*3, an output after an operation of the feature extractor is $\varphi(z)$ with a size of 6*6*256 and $\varphi(x)$ with a size of 22*22*256.

5. The target tracking method of the spiking neural network based on the event camera of claim 1, wherein an operation of the cross-correlation calculator comprises:

configuring a feature mapping denoted as $\varphi(z)$ after extracting features from the template image z to be a convolutional kernel, configuring a feature mapping $\varphi(x)$ after extracting features from the searched image x to be a feature map to be convolved, and performing a convolution operation on the convolutional kernel and the feature map to be convolved, wherein a result produced after the convolution operation of the current convolutional layer is a similarity heatmap that represents a prediction probability of a predicted center position of the target, and a position of a maximum spiking issuance rate is the predicted center position of the target.

6. The target tracking method of the spiking neural network based on the event camera of claim 1, wherein the twin network is generated by:

adopting a brain-inspired computing development framework, and putting a padded template image and the searched image into the same batch sequentially based on batch training, so that the number of neurons in an input layer for the padded template image is the same as that for the searched image, and the padded template image and the searched image share the same network connection;

after operation of the feature extractor denoted as $\varphi$, cropping an output of an odd-numbered sample that is an output of a z-branch denoted as $\varphi(z)$ to delete edge-padding of $\varphi(z)$, and obtaining the feature mapping with a due size of 6*6*256.

7. The target tracking method of the spiking neural network based on the event camera of claim 1, further comprising:

performing no update on the target image that is the template image, performing an operation $\varphi(z)$ of the feature extractor for an initial target once, configuring the searched image to be an image equivalent to 4 times a size of the template image, wherein the searched image is centered on the position of the target and cropped from a previous synchronous event frame, and a search area is narrowed to improve real-time performance;

adopting bicubic interpolation to up-sample and revert a size of the similarity heatmap, determining a predicted position of the target, adopting three scales to search, that is, scaling the similarity heatmap to $1.03^{\{-1,0,1\}}$, respectively; and selecting a position of a maximum spiking issuance rate from a scaling output as a final result, wherein the maximum spiking issuance rate is a maximum similarity.

8. An electronic device, comprising a processor and a memory, wherein the memory stores a computer program executable by the processor to implement the steps of the target tracking method of the spiking neural network based on the event camera of claim 1.

9. The electronic device of claim 8, wherein the synchronous event frames are generated by dividing the asynchronous events according to a set size and number of time steps, accumulating the data stream of the asynchronous events within each time step, setting a pixel of a coordinate to 1 as long as the number of the asynchronous events generated at the coordinate within the same time step is greater than 0, otherwise setting the pixel of the coordinate to 0, and ultimately generating event frame images divided by the time steps.

10. The electronic device of claim 8, wherein the feature extractor is generated by adopting a spiking convolutional neural network as the feature extractor, wherein a network structure of the spiking convolutional neural network is 96C5-2S-256C3-2S-384C3-384C3-256C3, wherein 96C5 represents a spiking convolutional layer with a convolutional kernel size of 5 and an output channel of 96, 2S represents a pooling layer with a down-sampling of 2 times, and the rest network structure is in a similar manner; a convolutional step of a first convolutional layer is 2, convolutional steps of the rest convolutional layers are 1, and all of convolutional layers of the feature extractor are followed by a spiking neuron.

11. The electronic device of claim 10, wherein the spiking neuron is a Leaky integrate and fire neuron model, i.e., $$\tau_m \frac{dV}{dt} = V_{rest} - V + R_m I$$

wherein $\tau_m$ represents a membrane time constant, V represents a membrane potential, t represents a spiking time, $V_{rest}$ represents a resting potential, and $R_m$ and I represent impedance and input current of a cell membrane, respectively;

the feature extractor is denoted as φ, a size of the template image z is 255*255*3, a size of the searched image x is 127*127*3, an output after an operation of the feature extractor is φ(z) with a size of 6*6*256 and φ(x) with a size of 22*22*256.

12. The electronic device of claim 8, wherein an operation of the cross-correlation calculator comprises:

configuring a feature mapping denoted as φ(z) after extracting features from the template image z to be a convolutional kernel, configuring a feature mapping φ(x) after extracting features from the searched image x to be a feature map to be convolved, and performing a convolution operation on the convolutional kernel and the feature map to be convolved, wherein a result produced after the convolution operation of the current convolutional layer is a similarity heatmap that represents a prediction probability of a predicted center position of the target, and a position of a maximum spiking issuance rate is the predicted center position of the target.

13. The electronic device of claim 8, wherein the twin network is generated by:

adopting a brain-inspired computing development framework, and putting a padded template image and the searched image into the same batch sequentially based on batch training, so that the number of neurons in an input layer for the padded template image is the same as that for the searched image, and the padded template image and the searched image share the same network connection;

after operation of the feature extractor denoted as φ, cropping an output of an odd-numbered sample that is an output of a z-branch denoted as φ(z) to delete edge-padding of φ(z), and obtaining the feature mapping with a due size of 6*6*256.

14. The electronic device of claim 8, further comprising:

performing no update on the target image that is the template image, performing an operation q (z) of the feature extractor for an initial target once, configuring the searched image to be an image equivalent to 4 times a size of the template image, wherein the searched image is centered on the position of the target and cropped from a previous synchronous event frame, and a search area is narrowed to improve real-time performance;

adopting bicubic interpolation to up-sample and revert a size of the similarity heatmap, determining a predicted position of the target, adopting three scales to search, that is, scaling the similarity heatmap to $1.03^{\{-1,0,1\}}$, respectively; selecting a position of a maximum spiking issuance rate from a scaling output as a final result, wherein the maximum spiking issuance rate is a maximum similarity.

15. A non-transitory computer-readable storage medium having stored a computer program, wherein the computer program is executed by a processor to implement the steps of the target tracking method of the spiking neural network based on the event camera of claim 1.

16. The non-transitory computer-readable storage medium of claim 15, wherein the synchronous event frames are generated by dividing the asynchronous events according to a set size and number of time steps, accumulating the data stream of the asynchronous events within each time step, setting a pixel of a coordinate to 1 as long as the number of the asynchronous events generated at the coordinate within the same time step is greater than 0, otherwise setting the pixel of the coordinate to 0, and ultimately generating event frame images divided by the time steps.

17. The non-transitory computer-readable storage medium of claim 15, wherein the feature extractor is generated by adopting a spiking convolutional neural network as the feature extractor, wherein a network structure of the spiking convolutional neural network is 96C5-2S-256C3-2S-384C3-384C3-256C3, wherein 96C5 represents a spiking convolutional layer with a convolutional kernel size of 5 and an output channel of 96, 2S represents a pooling layer with a down-sampling of 2 times, and the rest network structure is in a similar manner; a convolutional step of a first convolutional layer is 2, convolutional steps of the rest convolutional layers are 1, and all of convolutional layers of the feature extractor are followed by a spiking neuron.

18. The non-transitory computer-readable storage medium of claim 17, wherein the spiking neuron is a Leaky integrate and fire neuron model, i.e., $$\tau_m \frac{dV}{dt} = V_{rest} - V + R_m I$$

wherein $\tau_m$ represents a membrane time constant, V represents a membrane potential, t represents a spiking time, $V_{rest}$ represents a resting potential, and $R_m$ and I represent impedance and input current of a cell membrane, respectively;

the feature extractor is denoted as φ, a size of the template image z is 255*255*3, a size of the searched image x is 127*127*3, an output after an operation of the feature extractor is φ(z) with a size of 6*6*256 and φ(x) with a size of 22*22*256.

19. The non-transitory computer-readable storage medium of claim 15, wherein an operation of the cross-correlation calculator comprises:

configuring a feature mapping denoted as φ(z) after extracting features from the template image z to be a convolutional kernel, configuring a feature mapping φ(x) after extracting features from the searched image x to be a feature map to be convolved, and performing a convolution operation on the convolutional kernel and the feature map to be convolved, wherein a result produced after the convolution operation of the current convolutional layer is a similarity heatmap that represents a prediction probability of a predicted center position of the target, and a position of a maximum spiking issuance rate is the predicted center position of the target.

* * * * *